Dec. 5, 1944.  P. W. MARTINEAU  2,364,155
LIGHT CARRIER AND POSITIONING MEANS
Filed April 8, 1942  2 Sheets-Sheet 1
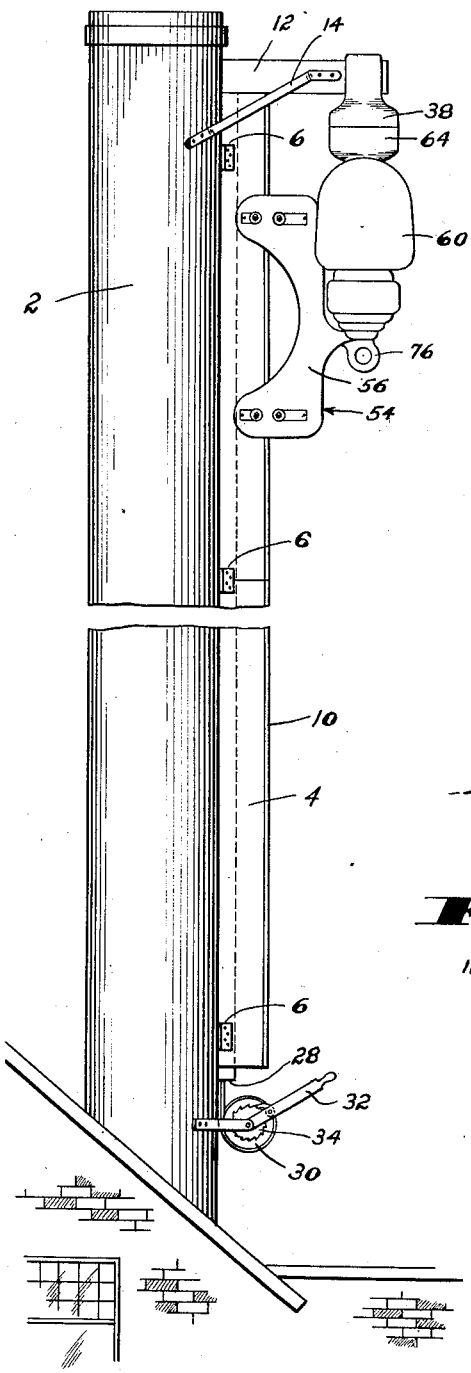
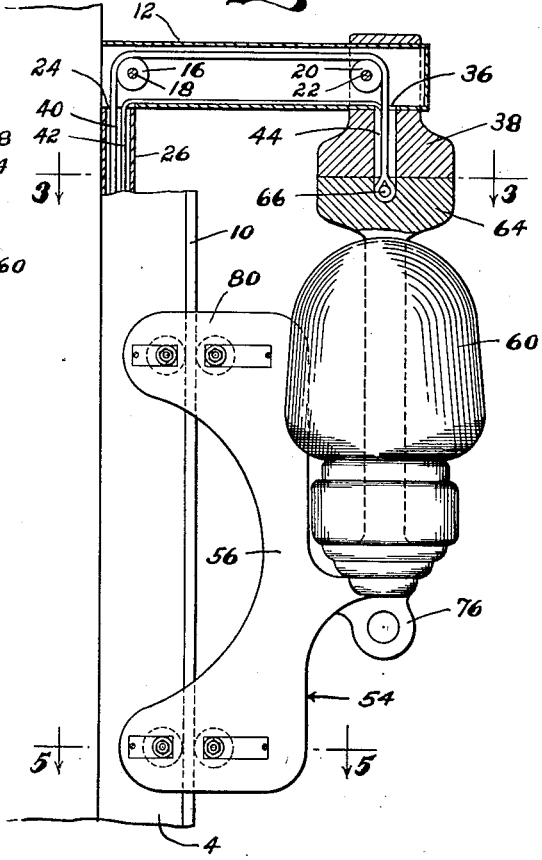
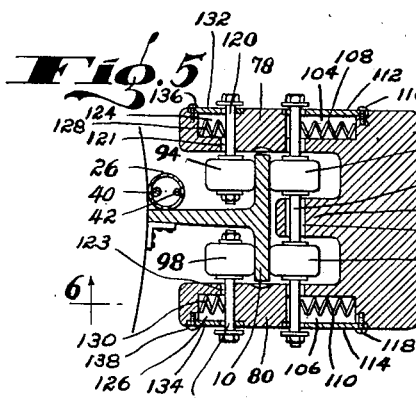
Inventor
Paul W. Martineau
By C. Yardley Chittick
Attorney

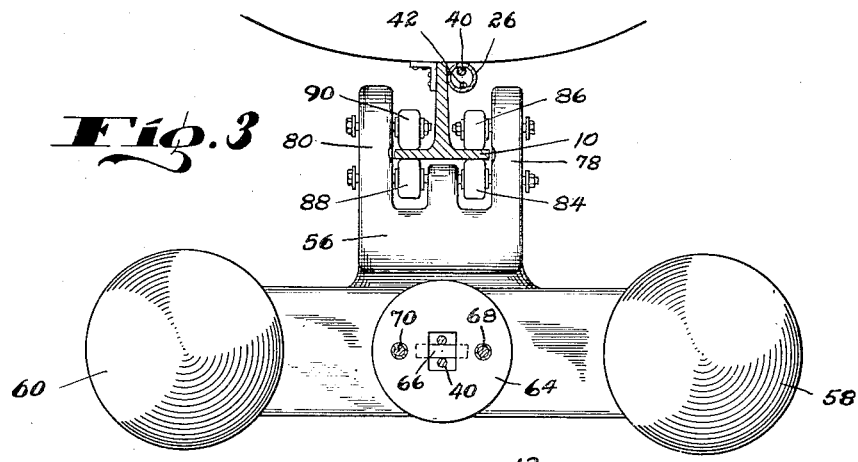
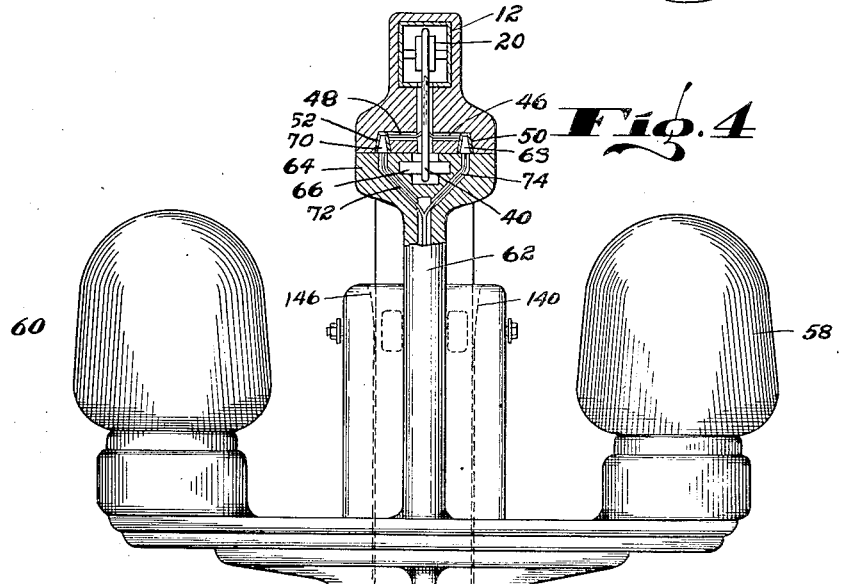
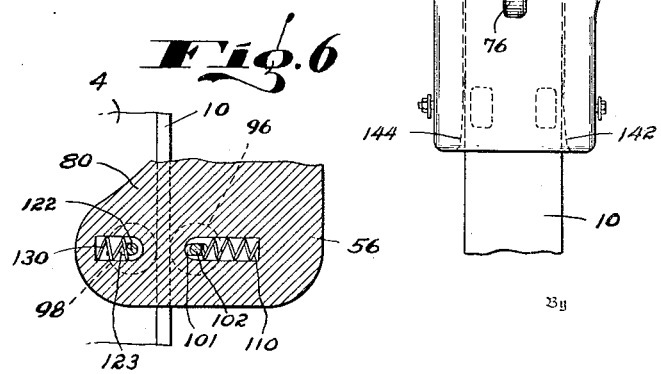
Inventor
Paul W. Martineau

Patented Dec. 5, 1944

2,364,155

UNITED STATES PATENT OFFICE 2,364,155

LIGHT CARRIER AND POSITIONING MEANS

Paul W. Martineau, Bronx, N. Y., assignor to Dorothy A. Martineau, Bronx, N. Y.

Application April 8, 1942, Serial No. 438,065

12 Claims. (Cl. 248—319)

This invention relates to the construction, positioning and maintenance of obstruction lights which are customarily positioned on tall buildings, structures, poles or other high objects in the vicinity of airports that must be marked at night.

The invention may also be used in other situations wherever it is desired to maintain a light in a relatively inaccessible place but at the same time have provision for lowering it to a position where it may be serviced if necessary.

The invention contemplates the use of standard parts and other easily obtainable materials, and it further provides a construction which will render the lights secure against vibration or swinging in high winds, thereby to increase the life of the entire unit and particularly the life of the electric light filaments.

The construction is also designed to provide adequate protection against corrosive gases which may be present when the invention is used on smokestacks or chimneys or in other places where such gases may be present.

These and other objects of the invention will become more apparent as the description proceeds with the aid of the accompanying drawings, in which Fig. 1 is a side elevation of the invention as applied to a chimney.

Fig. 2 is an enlarged side elevation of the light and carrier with certain parts broken away.

Fig. 3 is a plan view on the line 3—3 of Fig. 2.

Fig. 4 is a side elevation looking from the right of Fig. 2 with a portion broken away in vertical section.

Fig. 5 is a plan view on the line 5—5 of Fig. 2.

Fig. 6 is a broken-away vertical section on the line 6—6 of Fig. 5.

Referring to Fig. 1, there is illustrated a supporting structure 2, which in the present instance is shown as a chimney, although it will be understood that the invention may be used on any other type of supporting structure such as a gas tank, building, pole, or other object on which it may be desired to place a light.

Attached to the chimney 2 is a track 4, made of a plurality of T sections of the type commonly made by the steel mills. The track is secured to the structure in any convenient manner, one form of which is through the use of angle irons 6. H beams or I beams or a pair of channels back to back could be substituted for the T members to form the track. The primary requirement of the track formation is that there be an outer flange 10 on which the rollers of the carrier may travel. The lower end of the track is positioned at some location where it may be reached by the service man, while the upper end of the track extends to at least the point at which it is desired to position the light.

Extending outwardly from the upper end of the track is a supporting arm 12, which may be anchored to the structure in any suitable manner, and if necessary it may be laterally strengthened by braces 14. The supporting arm 12 is preferably tubular and contains at its inner end a pulley 16 rotatably mounted on an axle 18 and at its outer end another pulley 20 rotatably mounted on axle 22. An opening 24 at the rear of arm 12 is located directly above a pipe or conduit 26 which runs down the chimney or other structure alongside the track 4 to a terminal position as at 28. Located below the lower end of conduit 26 is a winding drum 30 which may be operated by lever 32 through the ratchet and pawl mechanism 34.

At the outer end of arm 12 is an opening 36 leading to a connection box 38 which carries the electrical contacts. These contacts are shown in Fig. 4 and will be more fully described hereinafter.

Extending upwardly through conduit 26 is a flexible steel cable 40 and electric light wires 42. The cable is affixed to the winding drum 30 at the lower end of the conduit and passes over pulleys 16 and 20 in arm 12 and thence downwardly through opening 36 and a passage 44 through the connection box 38. The electric light wires 42 likewise extend through arm 12 and opening 36 and part way down through passage 44, branching off at 46 and 48 (see Fig. 4) to connect with socket-shaped terminal members 50 and 52.

The end of cable 40 is connected to a lamp carrier, generally referred to as 54, which carrier consists of a body portion 56, light units 58 and 60, and lifting connection 62 which terminates at its top in connection box 64.

Cable 40 may be secured to the lifting connection 62 of the lamp carrier in any convenient manner. In the present instance it passes about a cross bar 66 mounted securely in the connection box 64. Suitable pronglike electrical connections 68 and 70 extend upwardly from the top of connection box 64 in a position to be received by the sockets 50 and 52. Electric light wires 72 and 74 lead downwardly from prongs 68 and 70 through the interior of lifting connection 62 and then outwardly to the lamp units 58 and 60. Thus it can be seen that electric power can be supplied to the lamps by means of the connections provided.

It will be understood that the electrical connections between connection boxes 38 and 64 are illustrative only and that any other type of suitable separable connection may be used instead.

The carrier body 56 is designed for travel up and down track 4 in such manner that it will be movable under all weather conditions from the uppermost position of electrical contact with connection box 38, as shown, to lower position within in reach of the service man. The combined weight of the carrier and associated parts is such that when the cable 40 is gradually unwound from drum 30, or otherwise released, the electrical connections 50, 52, 68 and 70 will automatically separate and the lamp carrier will descend along track 4. If by any chance the weight of the carrier is insufficient to descend of its own accord upon release of cable 40, then provision has been made through eye 76 to hang an additional weight, not shown, thereon so that the resulting combined weight will be sufficient to overcome any frictional resistances. In this manner, descent of the lamp carrier is assured upon release of cable 40.

The body of the carrier may be made in any convenient manner, either from a casting or machined part or through the assembly of suitably formed individual pieces. Referring to Figs. 3 and 5, the body 56, viewed vertically, is in general U-shaped, having legs 78 and 80 far enough apart to straddle the flange 10. For lightness and economy, the legs may be cut away at 82 (see Fig. 2).

Four pairs of wheels or rollers are provided, two pair at the top and two pair at the bottom. The upper rollers are designated as 84, 86, 88 and 90 (see Fig. 3), while the lower wheels are designated as 92, 94, 96 and 98 (see Fig. 5). The purpose of the wheels is to provide means for easy movement of the carrier along the track under all weather conditions that may be encountered and, at the same time, to direct the electrical contacts into engagement and to hold the lamp carrier substantially vibrationless with respect to the track 4 and arm 12. It will be appreciated that in the winter accumulations of ice or snow may appear on the flange 10 which might hinder the movement of the wheels thereby. To obviate any such trouble, the wheels are spring pressed against opposite sides of the flange so that if any obstruction appears, the wheels may separate as much as necessary to pass thereover. Similarly, if the flange should decrease in thickness through wear or corrosion, the spring-pressed wheels are able to reduce the distance therebetween so that the carrier will at all times be firmly and accurately supported on the track flange.

One form of wheel mounting which has been found satisfactory is disclosed in detail in Figs. 5 and 6. A central vertical flange 100 extends forwardly from the base of the U-shaped formation of body 56. Through the legs 78 and 80 and flange 100 are aligned holes 101 in which axle 102 is positioned. The horizontal dimension of the axle holes is greater than the axle diameter so as to provide room for lateral movement of the axle. On axle 102 are mounted wheels 92 and 96, previously referred to, and which may have any suitable type of bearing such as balls or rollers. The axle is maintained in place longitudinally by the usual nut and washer construction. Extending horizontally from the axle position in legs 78 and 80 are cavities 104 and 106, in which are positioned compressed coil springs 108 and 110 which exert a pressure against axle 102, urging it to the left as viewed in Fig. 5. Cavities 104 and 106 are closed on their outsides by cover plates 112 and 114 having axle openings therethrough corresponding to holes 101. The cover plates are held removably in place by screws 116 and 118. The purpose of this construction is to provide means for packing the cavities with grease or other lubricant so that the axle 102 will be freely movable under the urging of springs 108 and 110.

Wheels 94 and 98, separated by the track web, are held in position by individual axles 120 and 122 located in holes 121 and 123. In order to urge axles 120 and 122 to the right as viewed in Fig. 5, cavities 124 and 126 are provided in which are placed compressed coil springs 128 and 130. Cover plates 132 and 134 have axle openings corresponding to the holes 121 and 123. The plates, held in position by screws 136 and 138, provide access to cavities 124 and 126 for lubrication purposes.

It will be apparent from the foregoing that by virtue of the clearance between axle 102 and the holes 101 through which it extends, the wheels of each pair may approach each other as may be necessary to hold a flange of diminished thickness firmly therebetween or the wheels may separate if necessary to ride over any obstruction on the flange.

The description given of the lower two pair of wheels in Fig. 5 is applicable to the upper sets of wheels shown in Fig. 3 and accordingly need not be repeated.

The wheel construction described results in holding the carrier 54 firmly and substantially vibrationless on the track, and the accuracy of its travel is sufficient to insure engagement of the prongs and sockets in the two connection boxes when the unit is raised to lighting position. It is obvious that no matter what the wind conditions may be, the carrier cannot swing or vibrate in the breeze, which results in greatly increasing the life of the electric light filaments. When the unit is lowered for repairs or inspection, the carrier follows its set course on the track, and accordingly no guide wires or other guiding means are necessary to prevent the carrier from being dashed against the supporting structure, as often happens with light carriers of the types now in common use.

It will be further understood that the particular shape of the carrier may be modified as desired. The number of lights carried thereby may be varied at will. The particular electrical connections in the connection boxes may likewise be changed, and the horizontal distance of the lights from the supporting structure may also be controlled through varying the length of supporting arm 12 and the corresponding outward extension from the body of the carrier.

Since the track is usually made up of a plurality of T sections joined end to end, there is some possibility that the alignment of the outer edges of the abutting flanges might not be perfect. In order to preclude the carrier from catching on the end of a flange over which it is about to pass, the inner sides of the legs 78 and 80 of the carrier are beveled at their upper and lower ends, as at 140, 142, 144 and 146 (see Fig. 4), thereby enabling the carrier to be successfully guided onto any improperly aligned flange. The clearance between the inner sides of legs 78 and 80 and the flange edges is sufficient so that free passage along the flange will always be assured under conditions of normal construction such as would be present when the track was mounted on the supporting structure by workmen familiar with such matters.

While one form of track and rollers for engaging the track have been shown, it will be appreciated that there are other track and roller arrangements that could be used without departing from the scope of the invention. Similarly, the hoisting mechanism may be modified as may be convenient. It is not intended that the invention be limited in any way by the specific form disclosed, but only by the following claims.

I claim:

1. In combination, a supporting structure, a track mounted vertically thereon, said track comprising a T-section with the flange thereof away from the surface of said structure, a light carrier movably mounted on said track, said carrier including means for gripping said flange on either side whereby said carrier may move longitudinally only with respect to said flange, electrical connections fixed with respect to said structure near the upper end of said track, corresponding electrical connections on said carrier, and means for raising said carrier to a position where said electrical connections will be brought into engagement with each other.

2. In combination, a supporting structure, a track mounted in vertical position on said structure, said track formed with a flange spaced from and substantially parallel to the surface of said structure, a carrier mounted for vertical movement along said track, said carrier comprising a body portion having at least two pairs of wheels, the wheels of each pair urged toward each other by spring means and engaging opposite sides of said flange, each pair of wheels capable of movement toward or away from each other as the thickness of the flange passing between said wheels may vary, an electric lamp mounted on said carrier and having electrical connections thereto, a supporting arm mounted on said structure and extending away from said structure a distance sufficient to overhang said carrier, electrical connections carried at the outer end of said arm in such position that when said carrier is raised a sufficient distance on said track the electrical connections on said carrier and said arm will come into engagement whereby electric current may be made available to said lamp, and a hoisting cable carried by said arm and connected to said carrier whereby said carrier may be raised or lowered.

3. A light carrier comprising a body portion and a support for a light, said body portion having extending therefrom spaced side supports adapted to straddle a track, a wheel mounted within said supports, means for resiliently urging said wheel toward said body portion, a second wheel mounted within said supports between said first wheel and said body portion, and means for resiliently urging said second wheel away from said body portion, said wheels capable of being spaced so that a track member may pass therebetween while being continuously engaged by said wheels.

4. In combination, a track and a light carrier slidably mounted thereon, said track comprising a T-shaped member having a flange adapted to be engaged on opposite sides, at least two wheels mounted on said carrier in such position as to engage said flange on its under side, another wheel mounted on said carrier in a position to engage said flange at its outer side, said wheels normally arranged in such manner as to preclude removal of said carrier from said flange except at the ends thereof.

5. The combination set forth in claim 4 in which said wheels are resiliently mounted on said carrier by spring means urging said wheels toward the opposite faces of said flange whereby said wheels will remain in firm engagement with said flange as said carrier may be moved therealong.

6. In combination, a supporting structure, a track mounted vertically thereon, said track comprising a member having a flange away from the surface of said structure, a cantilever type light carrier movably mounted on said track and extending away from said structure beyond said flange, said carrier including means for resiliently gripping said flange on either side whereby said carrier may be moved longitudinally only with respect to said flange and whereby said resiliently gripping means will permit movement over irregularities on said flange, electrical connections fixed with respect to said structure near the upper end of said track, corresponding electrical connections on said carrier and means for raising said carrier to a position where said electrical connections will be brought into engagement with each other.

7. In combination, a supporting structure, a track mounted in upright position on said structure, said track formed with a flange spaced from and substantially parallel to the surface of said structure, a carrier mounted for movement along said track, said carrier comprising a body portion outboard of said track and having resilient members urged against said flange, said members capable of movement toward or away from each other as the thickness of the flange passing between said members may vary, an electric lamp mounted on said carrier and having electrical connections thereto, electrical connections fixed with respect to said track in such position that when said carrier is raised a sufficient distance on said track the electrical connections on said carrier will come into engagement with said fixed electrical connections whereby electric current may be made available to said lamp and hoisting means whereby said carrier may be raised or lowered.

8. In combination, a track with a flange, a cantilever type light carrier in which the body of said carrier extends outwardly away from said track and at right angles to said flange, flange engaging means on said carrier comprising extensions of said carrier body disposed to engage immovably said track when any crosswise or rotary movement of said carrier is attempted with respect to said flange, resilient means on said carrier engaging said flange on opposite sides in such manner as to permit substantially vibrationless longitudinal movement thereon regardless of irregularities that may be present on said flange.

9. In combination, a track and a light carrier, said track comprising a member having a flange along which said carrier may move and another portion at an angle thereto adapted to be connected to a supporting structure with said flange spaced therefrom, a pair of wheels mounted on said carrier in a position to engage said flange on one side, and at least one other wheel mounted on said carrier to engage said flange on the other side, spring means for resiliently urging said wheels toward said flange whereby said wheels will remain in close engagement with said flange while said carrier is moved therealong regardless of variations in the thickness of said flange, means for preventing any substantial movement of said carrier with respect to said track except in the direction of said flange, and electrical connections mounted on and so positioned with respect to said carrier as to be readily engageable by other corresponding electrical connections when said carrier is moved along said track to engaging position.

10. In combination, a track and a light carrier, said track comprising a member having a flange along which said carrier may move and another portion at an angle thereto adapted to be connected to a supporting structure with said flange spaced therefrom and substantially parallel thereto, a pair of wheels mounted on said carrier in a position to engage said flange on one side, and at least one other wheel mounted on said carrier to engage said flange on the other side, spring means for resiliently urging said wheels toward said flange whereby said wheels will remain in close engagement with said flange while said carrier is moved therealong regardless of variations in thickness of said flange, and means associated with said carrier for engaging said track to prevent appreciable movement of said carrier with respect to said track in all directions except in the longitudinal direction of said flange.

11. In combination, a single track with a flange and another portion adapted to be mounted on a structure so that said flange will be spaced therefrom and generally parallel thereto, a cantilever type light carrier, antifriction means engaging opposite sides of said flange for mounting said carrier on said track so that it shall be substantially vibrationless while at the same time free to move longitudinally on said track, said carrier having parts connected thereto that engage the edges of said flange to prevent lateral movement of said carrier while said antifriction means prevents transverse movement of said carrier with respect to said flange.

12. In combination, a supporting structure, a track mounted in vertical position on said structure, a light carrier mounted on said track, said carrier structure comprising wheels disposed on opposite faces of said track and engaging a portion of said track therebetween, additional carrier structure to prevent said wheels from transverse removal from said track, at least one of said wheels being spring pressed in the direction of said track, the wheels on opposite sides of said track movable with respect to each other as the thickness of the engaged portion of said track may vary, an arm extending outwardly from said structure, electrical connections carried by said arm, corresponding electrical connections mounted on said carrier, and means for raising and lowering said carrier along said track to bring said electrical connections into or out of adjustment.

PAUL W. MARTINEAU.